(12) United States Patent
Reed et al.

(10) Patent No.: US 7,487,834 B2
(45) Date of Patent: Feb. 10, 2009

(54) METHODS OF USING A LASER TO PERFORATE COMPOSITE STRUCTURES OF STEEL CASING, CEMENT AND ROCKS

(75) Inventors: Claude B. Reed, Bolingbrook, IL (US); Zhiyue Xu, Naperville, IL (US)

(73) Assignee: UChicago Argonne, LLC, Chicago, IL (US)

( * ) Notice: Subject to any disclaimer, the term of this patent is extended or adjusted under 35 U.S.C. 154(b) by 235 days.

(21) Appl. No.: 11/404,697

(22) Filed: Apr. 14, 2006

(65) Prior Publication Data

US 2006/0231257 A1 Oct. 19, 2006

Related U.S. Application Data

(60) Provisional application No. 60/672,761, filed on Apr. 19, 2005.

(51) Int. Cl.
*E21B 29/00* (2006.01)
(52) U.S. Cl. .................. 166/297; 166/302; 175/15; 219/121.71
(58) Field of Classification Search .......... 166/297, 166/298, 302, 60; 175/11, 15, 16; 219/121.7, 219/121.71, 121.73, 121.75, 121.84, 121.6
See application file for complete search history.

(56) References Cited

U.S. PATENT DOCUMENTS

| 4,113,036 | A * | 9/1978 | Stout ........................... 175/11 |
| 4,282,940 | A * | 8/1981 | Salisbury et al. .............. 175/11 |
| 6,649,864 | B2 * | 11/2003 | De Steur et al. ........ 219/121.71 |
| 2004/0206505 | A1 * | 10/2004 | Batarseh ..................... 166/302 |
| 2006/0102343 | A1 * | 5/2006 | Skinner et al. ........... 166/250.1 |

* cited by examiner

*Primary Examiner*—Jennifer H Gay
*Assistant Examiner*—Robert E Fuller
(74) *Attorney, Agent, or Firm*—Joan Pennington

(57) ABSTRACT

Apparatus and methods of using lasers are provided for the perforation of oil and gas well casings and rock formations. A rock removal process called laser spallation is provided that utilizes a combination of laser-induced thermal stress and laser induced superheated steam explosions just below the surface of the laser/rock interaction to spall or fracture the rock into small fragments that can then be easily removed from the rock formation. The use of high power laser beams of kilowatt level is provided to rapidly cut the steel casings and perforate into the formation. Techniques of the invention increase permeability and reduce hole tapering while perforating a deep hole in reservoir rock formations.

12 Claims, 2 Drawing Sheets

METHODS OF USING A LASER TO PERFORATE COMPOSITE STRUCTURES OF STEEL CASING, CEMENT AND ROCKS

This application claims the benefit of U.S. Provisional Application No. 60/672,761, filed on Apr. 19, 2005.

CONTRACTUAL ORIGIN OF THE INVENTION

The United States Government has rights in this invention pursuant to Contract No. W-31-109-ENG-38 between the United States Government and Argonne National Laboratory.

FIELD OF THE INVENTION

The present invention relates to improved methods and apparatus for the perforation of oil and gas well casings and reservoir rock formations. More specifically this invention relates the use of lasers for cutting holes in oil and gas well casings, then drilling holes via laser spallation into reservoir rock formations for the perforation of rocks while increasing formation permeability.

DESCRIPTION OF THE RELATED ART

A conventional method for perforating gas and oil wells is the use of explosive devices that are lowered into the well on an electrical wire line to the required depth and fired electrically to perforate the casing, surrounding cement, and reservoir rock. The casing is in place to prevent the hole from collapsing, but it also prevents the oil or gas from entering the well bore. Therefore holes are made through the casing and cement lining and into the reservoir rock formation. A significant problem with conventional explosive charge perforation is that it often produces formation damage or permeability reduction while perforating the reservoir rock. This can substantially decrease the oil or gas production rate of the well. There are also very significant worker safety issues associated with explosive charge perforation.

Laser/rock interaction test data with a kilowatt level pulsed Nd:YAG laser show significant permeability increases up to 500% in laser-perforated Berea Grey sandstone. Tests have shown that, in certain types of limestone formations, lasing the area may increase permeability anywhere from 20 to 170%, depending on the type of formation. This is a significant advantage over the current explosive charge technique that usually produces formation damage or permeability reduction while perforating the rock. Rock perforation by laser beams also provides great flexibility in controlling the sizes and shapes of perforated holes that best suit the production formation.

The perforation operation is conducted in the production zone that is normally thousands of feet deep in the well. This requires the laser beam to be delivered over long distances without great loss of its quality and power. So far, fiber optic beam delivery is the only technology that has the potential and flexibility to deliver the high power beam over long distances with limited power loss.

U.S. Pat. No. 4,199,034 to Salisbury et al., issued Apr. 22, 1980 discloses a method and apparatus for perforating oil and gas wells. Using a laser, a high-powered coherent light beam is generated that is conducted down fiber optic cables to a selected depth and focused by a perforator unit. The perforator unit directs the laser beam laterally, or at any tilt angle from the horizontal to project a flow hole through the casing and into the adjoining subsurface formation.

U.S. Pat. No. 6,888,097 B2 to Batarseh, issued May, 3, 2005 discloses an apparatus for perforation of wellbore walls, which apparatus includes a fiber optic cable having a laser input end and a laser output end. A laser source is operably connected to the laser input end and a laser head is connected to the laser output end. The laser head includes laser control components for controlling at least one laser beam characteristic. Laser head control elements for controlling the motion and location of the laser head are operably connected to the fiber optic cable. The laser head is enclosed in a protective housing, which protects the fiber optic cable and elements, such as reflectors and lenses for controlling the laser beam emitted by the fiber optic cable disposed therein, from the harsh environments encountered in downhole operations.

Principal objects of the present invention are to provide methods of using lasers for the perforation of oil and gas well casings and reservoir rock formations. Other important objects of the present invention are to provide such methods of using lasers for the perforation of oil and gas well casings and reservoir rock formations substantially without negative effect and that overcome some of the disadvantages of prior art arrangements.

SUMMARY OF THE INVENTION

In brief, apparatus and methods of using lasers are provided for the perforation of oil and gas well casings and rock formations.

In accordance with features of the invention, a rock removal process called laser spallation is provided that utilizes a combination of laser-induced thermal stress and laser induced superheated steam explosions just below the surface of the laser/rock interaction to spall or fracture the rock into small fragments that can then be easily removed from the rock formation. The use of high power laser beams of kilowatt level is provided to rapidly cut the steel casings and perforate into the formation. Techniques of the invention increase permeability and reduce hole tapering while perforating a deep hole in reservoir rock formations.

Apparatus and a high power laser are provided for delivering a high power laser beam to the production zone of the borehole to perforate the casing, the cement, and form high permeability penetrations into the reservoir rock formation to enhance the flow of gas and/or oil into the well. The laser beam is delivered to a laser perforator located in the production zone by a fiber optic cable, bent about 90 degrees and shaped to the desired beam orientation and profile by optics. A cutting nozzle at the front of the perforator provides a purging flow to 1) remove from the hole the molten metal droplets, and the spalled cement and rock fragments that may block the beam and 2) create a clear path through wellbore liquid enabling the beam to reach the target surface while perforating. The beam shaping optics assembly is mounted on a motorized rotary stage so that it can be moved to cut a hole in the steel casing slightly larger in diameter than the hole to be perforated.

The beam is first focused on the casing, then offset from the centerline of the perforating hole to be cut, then moved in a circular or other shaped closed path to cut a hole through the steel casing. The beam is then defocused on the cement and rock to a size approximately one-half the diameter of the hole to be perforated, then offset approximately one-half beam diameter from the center of the hole to be perforated, then moved in a circular or other shaped closed path around the axis of the hole to perforate/trepan a hole into the cement and rock. The beam irradiance and traveling speed are set at such values that the laser removes cement and rock by laser spallation, the most energy efficient mechanism.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

In accordance with features of the invention, kilowatt level lasers with fiber optic cable delivery are strong candidates for laser perforation applications for oil and natural gas wells. Test data show that kilowatt level lasers can perforate rocks as efficiently as other higher power lasers do, and simultaneously increase the permeability of the lased reservoir rock up to 500%. A rock removal process, called laser spallation, utilizing a combination of laser-induced thermal stress and laser induced superheated steam explosions just below the surface of the laser/rock interaction to spall or fracture the rock into small fragments that can then be easily removed from the rock formation, is used. High intensity laser energy, applied on a rock that normally has very low thermal conductivity, concentrates locally on the rock surface area and causes the local temperature to increase instantaneously. This results in local thermal stresses in the rock subsurface. The laser energy also instantaneously vaporizes the moisture or liquid in the subsurface. The explosion of the vaporized liquid creates significant mechanical stresses in the rock. These laser-induced thermal and mechanical stresses spall the rock. The method of the invention also uses high power laser beams of kilowatt level to replace conventional explosive charge perforators to rapidly cut the steel casings and perforate into reservoir rock formations. The advantages of using laser spallation for rock perforation are four-fold: (1) a significant increase (up to 500%) in formation permeability, (2) rock removal is by spallation, so it is most efficient, (3) low required laser average power plays easy on beam fiber delivery, and (4) small rock debris or fragments are easily flushed out by purging fluids.

It is expected that the use of the invention would provide a major increase in well production and reduction in well perforation costs in that the use of a laser would permit faster drilling of perforations in the reservoir rock formation by laser spallation of the rock and also reduce or eliminate requirements for post-perforation treatments.

Figure 1:
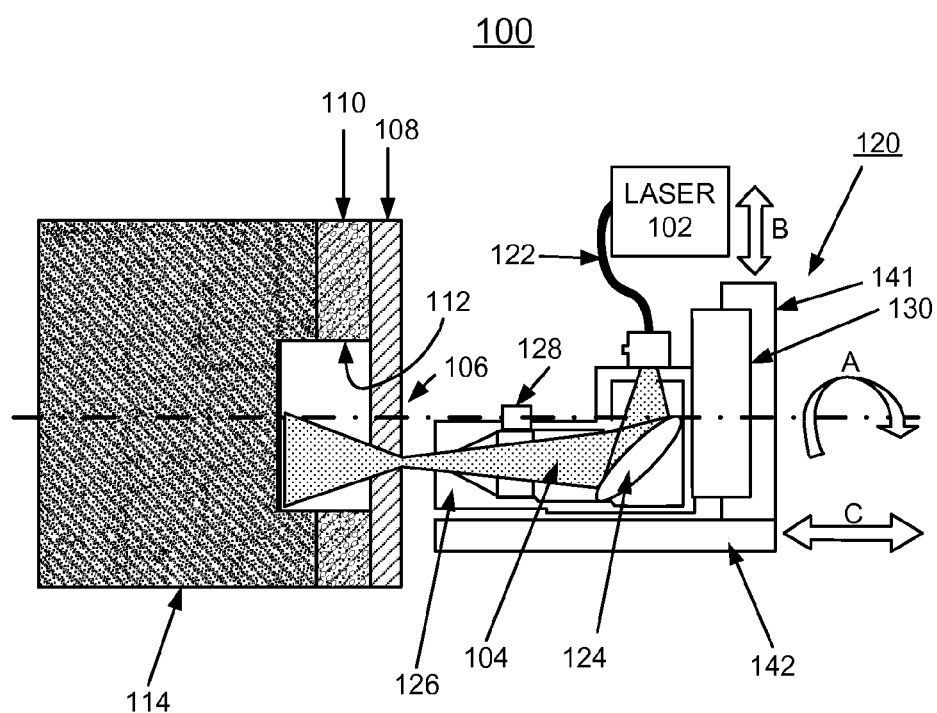
FIG. 1 is a schematic diagram illustrating apparatus for implementing methods of the invention in accordance with a preferred embodiment of the invention.

Having reference now to the drawings, in FIG. 1 there is shown apparatus generally designated by the reference character 100 for implementing methods of the invention in accordance with a preferred embodiment of the invention. Apparatus 100 includes a high power pulsed laser 102 for generating a laser beam 104. A fiber-optic cable 122 is used for delivering the high power laser beam 104 to a production zone indicated by the reference character 106 of a borehole to perforate a casing 108, cement 110 and form penetrations 112 into the reservoir rock formation 114 to enhance the flow of gas and/or oil into the production zone 106 of a borehole.

As shown, the laser beam 104 is delivered to a laser perforator generally designated by the reference character 120 located in the production zone 106 by the fiber optic cable 122, bent about 90 degrees to provide an outward tilted beam with respect to the axis of the hole to be perforated and shaped to the desired beam profile by optics 124. A cutting nozzle 126 at the front of the perforator 120 provides a purging flow indicated by 128 to remove the spalled rock fragments from the hole and to create a clear path through the wellbore liquid for the incoming beam to reach the rock. The beam shaping optics 124 are mounted on a motorized rotary stage 130 which in turn is mounted on a motorized linear stage 141. The linear stage 141 is mounted on another motorized linear stage 142. The rotary stage 130 is used to move the laser beam 104 such as indicated by an arrow labeled A while the linear stages 141 and 142 are used to offset the center and focusing position of the laser beam 104 with respect to the cutting surface such as indicated by a pair of arrows labeled B and C.

The tilted beam 104 is first focused on the steel casing 108, offset approximately one-half diameter of the hole to be perforated 112 from the center of the hole, and moved in a circular or other shaped closed path to cut a hole through the steel casing 108. The tilted beam 104 is then defocused by approximately one-half diameter of the hole to be perforated and offset one-half beam diameter from the center of the hole to be perforated and moved in a circular or other shaped closed path around the axis of the hole to perforate a hole into the cement 110 and reservoir rock 114. The beam irradiance and traveling speed are set at such values that the laser removes cement and reservoir rock by laser spallation, which in previous studies has been shown to be the most energy efficient rock removal mechanism. The beam tilting angle is set at such a value that the hole tapering can be reduced maximally.

The process parameters that contribute to the efficiency of reservoir rock perforation by a pulsed laser are: laser energy per millisecond, pulse width, pulse repetition rate, beam tilting angle, offset of beam centerline from hole centerline, beam spot size, beam relaxation time, beam traveling speed, purging flow configuration, and purging flow rate. Guidelines for parameter selection include selecting parameters that guarantee the hole is made in the rock by laser spallation, the mechanism that has been proven to be the most energy efficient and also produces the greatest permeability enhancement. Test data show that laser beam irradiance of 1000 to 5000 W/cm$^2$ is required to effectively spall sandstone and shale without melting the rocks, when the laser beam "on" time on the same rock location is controlled properly. Test data show that slightly titling the beam from the axis of the hole to be perforated significantly reduces the hole tapering half angles, making deep hole perforation possible. Tests also show that firing the kilowatt-level laser beam on the same rock location for too long produces melting of the rock and significantly reduces the rock removal rate. However, perforating a deep hole in some rocks may require a long-time laser exposure on the rock. One way to solve the melting problem is to divide this long-time laser exposure into a great number of short-time exposures so that a relaxation time between laser exposures on the same rock location can be introduced. But this further slows down the overall rock removal rate because laser "off" time is introduced. This invention solves this melting problem by moving the beam to cut adjacent locations in the reservoir rock. When the appropriate beam traveling speed and irradiance are applied, the beam continuously removes rock by laser spallation and produces a high rock removal rate.

Figure 2:
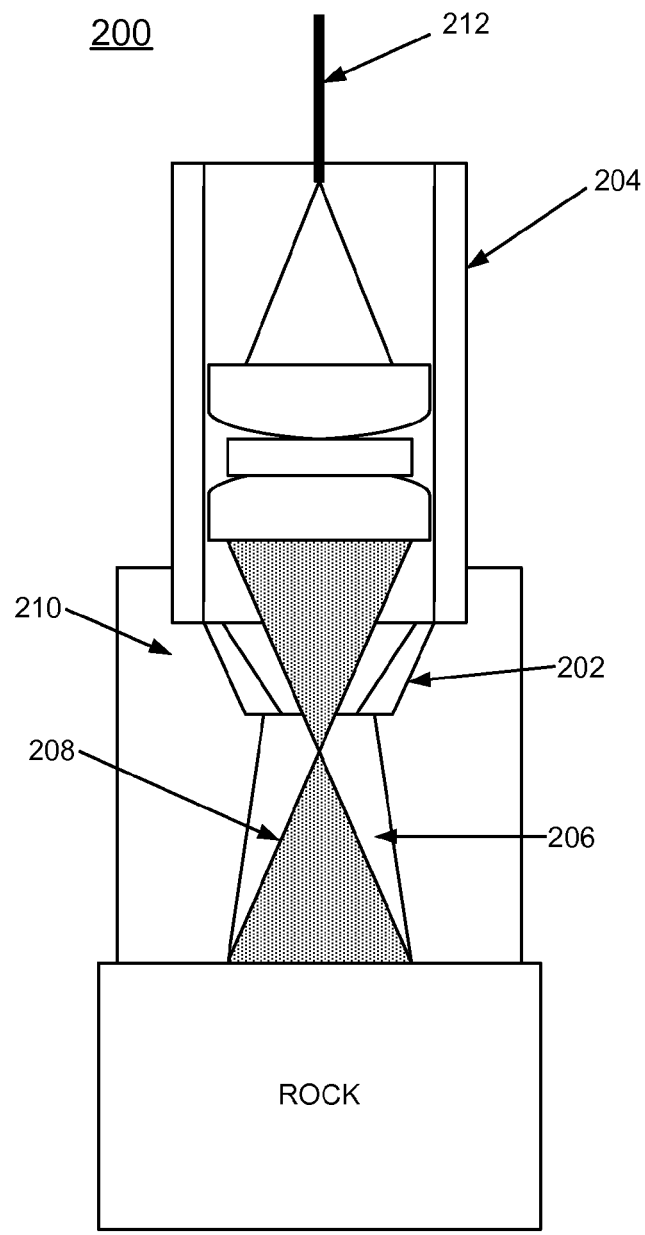
FIG. 2 is a schematic diagram illustrating apparatus for creating a clear-zone for the laser beam in accordance with a preferred embodiment of the invention.

Referring also to FIG. 2, there is shown apparatus generally designated by the reference character 200 for creating a clear-zone for the laser beam in accordance with a preferred embodiment of the invention. The standoff distance between a laser drilling head 204 and reservoir rock surface typically is filled with wellbore liquid 210 while drilling under downhole conditions. A nozzle 202 is provided with the laser head 204 for providing a clear path 206 for a laser beam 208. A liquid jet from the nozzle 202 is provided to steadily remove the wellbore liquid 210. The clear path 206 for the laser beam must be created over this gap to avoid significant laser power loss through the wellbore liquid 210. A fiber 212 is shown coupled to the laser head 204.

While the present invention has been described with reference to the details of the embodiments of the invention shown in the drawing, these details are not intended to limit the scope of the invention as claimed in the appended claims.

What is claimed is:

1. A method for perforation of oil and gas well casings and rock formations utilizing a high power laser beam to perforate the casing, and cement and form penetrations into a rock formation to enhance the flow of gas and oil into the wells comprising the steps of:
   delivering a high power laser beam to a laser perforator located in a production zone of a borehole;
   bending, tilting and shaping the high power laser beam to the desired beam orientation and profile;
   providing a nozzle coupled to said laser perforator for providing a purging flow to move spalled rock fragments out of the hole and to create a stable clear path removing wellbore liquid for the laser beam to reach the rock surface while perforating;
   focusing and offsetting the laser beam on the steel casing and rotating the focused laser beam to cut a hole through the steel casing;
   defocusing the laser beam by one-half diameter of the hole to be perforated and offsetting the laser beam by about one-half beam diameter from the center of the hole to be perforated and rotating the offset laser beam around the axis of the hole to perforate a hole into the cement and rock; the laser beam having an irradiance and rotation speed set for material removal by laser spallation and having a tilting angle set for minimum hole tapering.

2. A method for perforation of oil and gas well casings and rock formations as recited in claim 1 wherein the laser beam is a kilowatt level laser beam.

3. A method for perforation of oil and gas well casings and rock formations as recited in claim 1 wherein the laser beam is bent, tilted and shaped using optic lenses to the desired beam orientation and profile.

4. A method for perforation of oil and gas well casings and rock formations as recited in claim 1 wherein said nozzle is located at the front of said laser perforator.

5. A method for perforation of oil and gas well casings and rock formations as recited in claim 1 wherein the laser beam is focused by a focusing lens mounted on a motorized rotary stage; said focused laser beam being rotated to cut a hole in the steel casing having a diameter slightly larger than the diameter of the hole to be perforated in the rock formation.

6. A method for perforation of oil and gas well casings and rock formations as recited in claim 1 wherein the laser beam is delivered to the production zone by a fiber optic cable.

7. A method for perforation of oil and gas well casings and rock formations as recited in claim 1 wherein the step of defocusing and offsetting the laser beam, and rotating the defocused laser beam to cut a hole through the cement and rock formation includes the steps of providing a selected laser irradiance, a selected beam tilting angle, a selected rotary speed, a selected laser "on" time and a selected relaxation time between laser bursts.

8. A method for perforation of cement and rock formations of oil and gas wells as recited in claim 7 wherein the step of providing a selected beam irradiance includes the steps of providing the selected beam irradiance in a range between 1000 Watts per centimeter square and 5000 Watts per centimeter square.

9. A method for perforation of cement and rock formations of oil and gas wells as recited in claim 7 wherein the step of providing a selected beam tilting angle includes the steps of providing the selected beam tilting angle in a range between 0 degrees and 20 degrees from the axis of the hole to be perforated.

10. A method for perforation of cement and rock formations of oil and gas wells as recited in claim 7 wherein the step of providing a selected rotary speed includes the steps of providing the selected rotary speed in a range between 30 degrees per second and 100 degrees per second.

11. A method for perforation of cement and rock formations of oil and gas wells as recited in claim 7 wherein the step of providing a selected laser "on" time includes the steps of providing the selected laser "on" time in a range between 2 seconds and 12 seconds per complete revolution.

12. A method for perforation of oil and gas well casings and rock formations as recited in claim 7 wherein the step of providing a selected relaxation time between laser bursts includes the steps of providing the selected relaxation time between laser exposures in a range between 0 seconds and 2 seconds.

\* \* \* \* \*